(12) United States Patent
Louzoun et al.

(10) Patent No.: US 7,174,548 B2
(45) Date of Patent: Feb. 6, 2007

(54) MANAGING FIRMWARE DOWNLOAD

(75) Inventors: Eliel Louzoun, Jerusalem (IL); Jacob Twersky, Maale-Adumim (IL); Yifat Ben-Shahar, Mevaseret Zion (IL); Nimrod Diamant, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 09/976,285

(22) Filed: Oct. 15, 2001

(65) Prior Publication Data

US 2003/0074659 A1  Apr. 17, 2003

(51) Int. Cl.
G06F 9/44 (2006.01)
G06F 9/445 (2006.01)
G06F 13/00 (2006.01)

(52) U.S. Cl. .................................. 717/173; 719/321
(58) Field of Classification Search .............. 717/140, 717/142, 143, 156, 168–178; 716/2; 719/321
See application file for complete search history.

(56) References Cited

U.S. PATENT DOCUMENTS

| | | | | |
|---|---|---|---|---|
| 5,003,591 A | * | 3/1991 | Kauffman et al. | 380/232 |
| 5,539,896 A | * | 7/1996 | Lisle | 711/150 |
| 5,963,726 A | * | 10/1999 | Rust et al. | 703/13 |
| 5,966,543 A | * | 10/1999 | Hartner et al. | 710/200 |
| 6,539,438 B1 | * | 3/2003 | Ledzius et al. | 710/8 |
| 6,615,405 B1 | * | 9/2003 | Goldman et al. | 717/174 |
| 6,704,864 B1 | * | 3/2004 | Philyaw | 713/1 |
| 2002/0083228 A1 | * | 6/2002 | Chiloyan et al. | 710/9 |
| 2002/0166061 A1 | * | 11/2002 | Falik et al. | 713/200 |
| 2003/0041182 A1 | * | 2/2003 | Martwick | 710/1 |

OTHER PUBLICATIONS

Fleischmann, Josef; Buchenrieder, klaus; Dress, Rainer; "JAVA Driven Codesign and Prototyping of Networked Embedded Systems", 1999 ACM, retrieved Aug. 16, 2004.*
Gauthier, Lovie; Yoo, Sungjoo; Jerraya, Ahmed A; "Automatic Generation and Targeting of Application Specific Operating Systems and Embedded Systems Software", p. 670-685, 2001 IEEE, retrieved Aug. 16, 2004.*
Wallace, Malcolm; Runciman, Colin; "Lambdas in the Liftshaft- Functional Programming and an Embedded Architecture", p. 24258, 1995 ACM, retrieved Aug. 16, 2004.*
Stepner, David; Rajan, Nagarajan; Hui, David; "Embedded Application Design Using a Real-Time OS", 1999 ACM, retrieved Aug. 16, 2004.*

* cited by examiner

*Primary Examiner*—Mary Steelman
(74) *Attorney, Agent, or Firm*—Pearl, Cohen, Zedek, Latzer, LLP.

(57) ABSTRACT

A method including managing downloading of at least two firmware functions, which are accessible by more than one driver, with one processor.

27 Claims, 3 Drawing Sheets

MANAGING FIRMWARE DOWNLOAD

FIELD OF THE INVENTION

The present invention relates generally to managing download of firmware and functions implemented by firmware.

BACKGROUND OF THE INVENTION

Multi-function devices may comprise embedded firmware. A processor may be used to implement the functionality of the embedded firmware, wherein for each function, there may be an independent host driver. Host drivers may be required to download the firmware images before being able to use the functions.

An operating system, which is used to operate drivers connected to chips that implement the multi-function device, may load the drivers in an arbitrary order for each function. It may not be known in advance which driver of a function will be loaded first. If more than one driver should download the same embedded firmware inside the multi-function device (or chip), then an already downloaded firmware, which is already running, may be overwritten and reinitialized, thereby interrupting operation of that function. To complicate matters, each driver may implement different functionality, and the common firmware, which it is desired to download, may have to be updated accordingly.

BRIEF DESCRIPTION OF THE DRAWINGS

The present invention will be understood and appreciated more fully from the following detailed description taken in conjunction with the appended drawings wherein.

DETAILED DESCRIPTION OF THE PRESENT INVENTION

Figure 1:
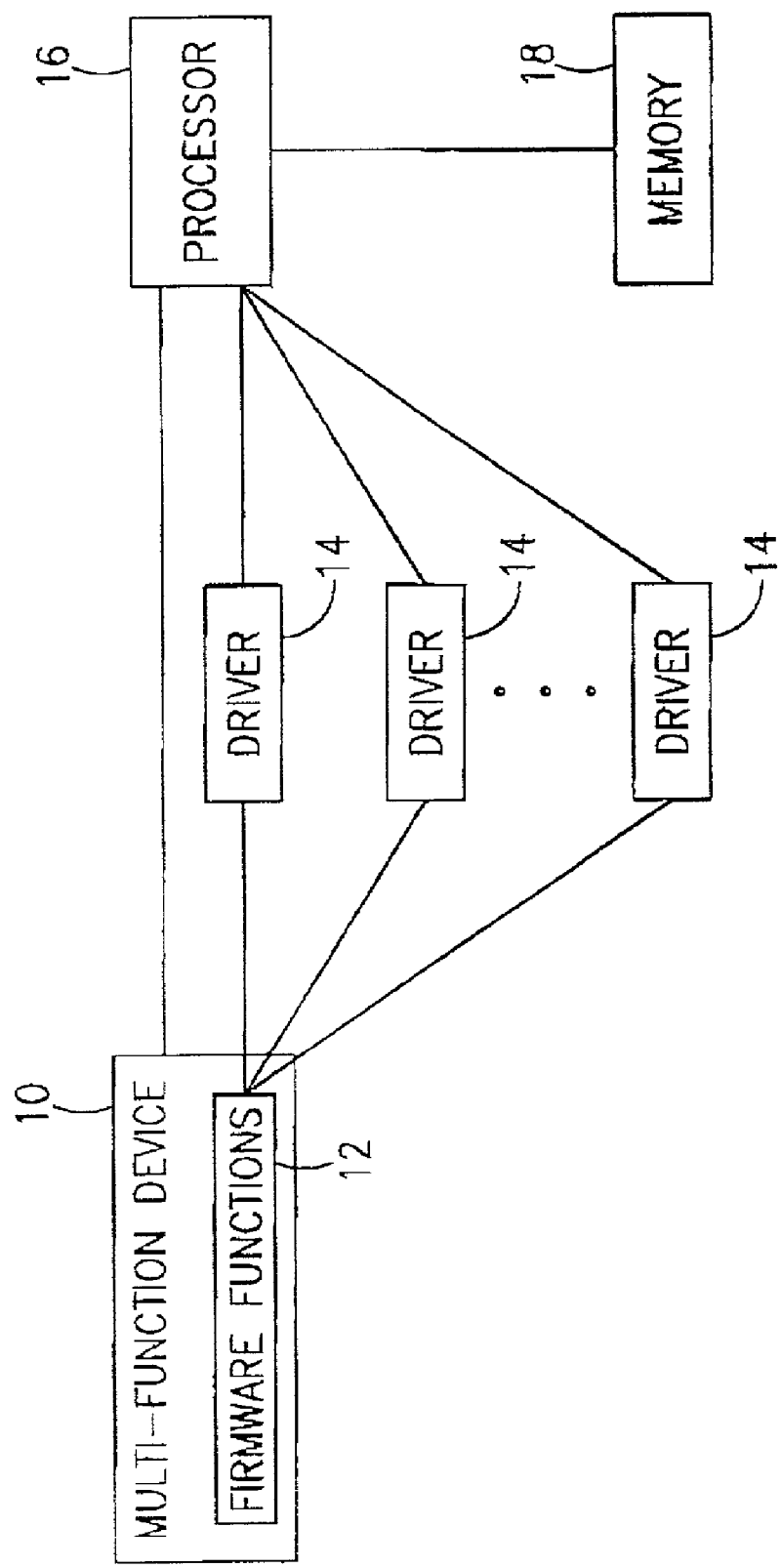
FIG. 1 is a simplified flow chart of a method for managing firmware download in accordance with an embodiment of the invention.
Figure 2A:
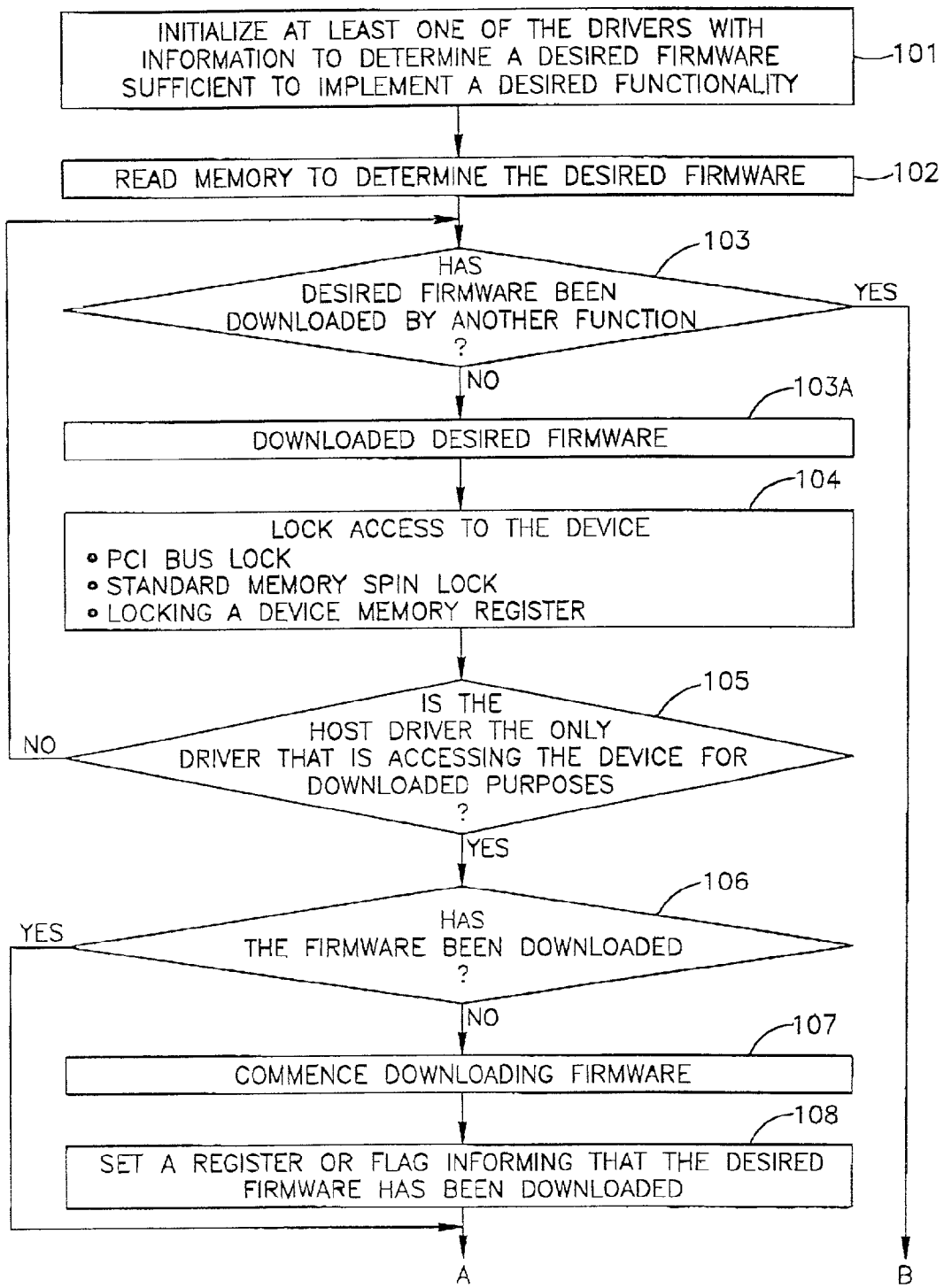
FIGS. 2A and 2B are a simplified block diagram of apparatus and a system for managing firmware download in accordance with an embodiment of the invention.
Figure 2B:
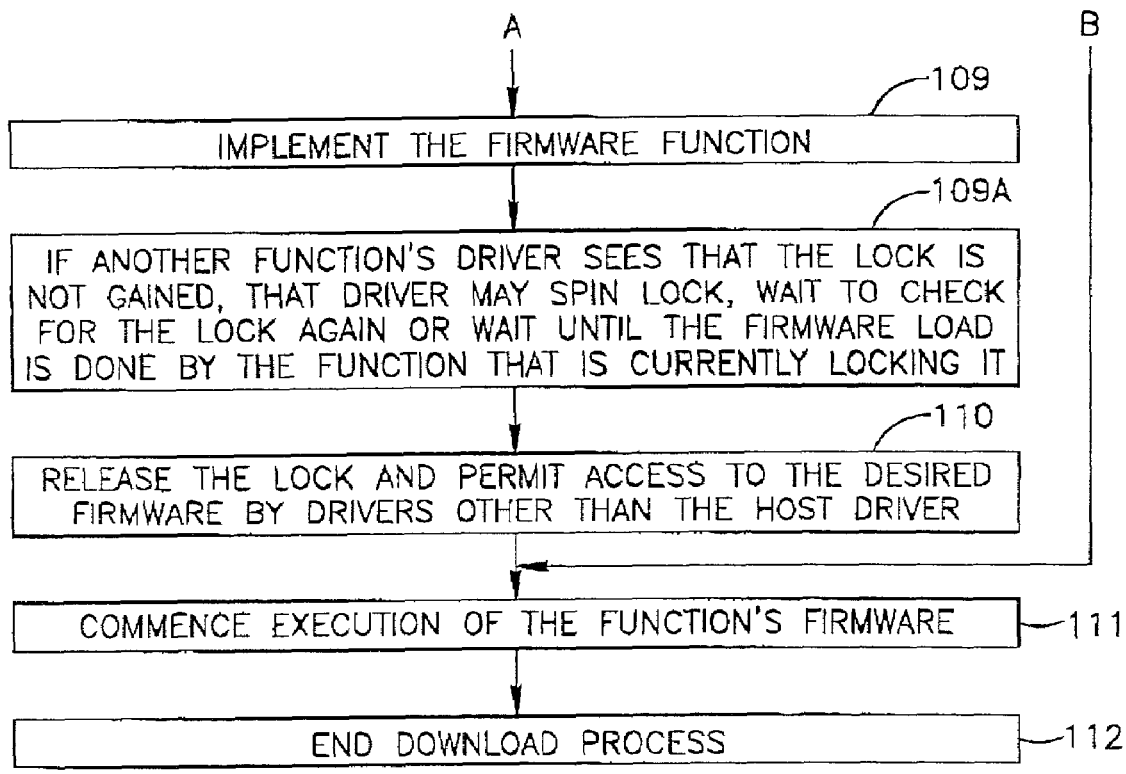

Reference is now made to FIGS. 1, 2A and 2B, which illustrate a method, apparatus and system for managing downloading of firmware functions in accordance with an embodiment of the invention.

A multi-function device 10 may comprise at least two firmware functions 12 which are accessible by more than one driver or by more than one access operation of the same driver 14. A "firmware function" refers to a function that may use firmware as at least part of its implementation; the function may also use dedicated hardware. A processor 16 may be adapted to manage downloading two or more firmware functions 12. In the system, there may be a memory 18 in communication with processor 16. The processor 16 may be adapted to reduce a risk of at least one of the drivers 14 overwriting firmware that has been downloaded and is being used by another of the drivers 14. The processor 16 may be adapted to download at least two firmware functions 12 with a single download.

Memory 18 may comprise without limitation an external electrically erasable, programmable read only memory (EEPROM), or an on-board factory programmable set of jumpers, for example, containing data about firmware functionality.

At least one of the drivers 14 may be initialized (step 101) with information to determine a desired firmware sufficient to implement a desired functionality. The driver 14, also referred to as a host driver 14, may read the memory 18 (step 102) during the initialization sequence to determine the desired firmware to implement the functionality for itself and for the other functions, such as but not limited to, the required chip functionality and which firmware modules need to be downloaded.

The driver 14 may verify if the desired firmware has been downloaded by another driver (step 103). This may be accomplished without limitation, for example, by the driver 14 checking a register (or a bit) accessible by all functions (e.g., FW_DL_done), to check if the firmware download was already done by one of the other functions. This register may appears in the function's register space and may be accessible for read and writes by the functions.

If the firmware has been downloaded already, then execution of the function's firmware may commence (step 111) and the download process may end (step 112). If the firmware has not been downloaded already by another function, then the desired firmware may be downloaded (step 103A).

The driver 14 may lock the access to the device 10 (step 104). Locking the device 10 may be implemented in several ways, such as but not limited to:

a. a standard memory spin lock, which may require that the drivers spin lock on a memory location common to all of the drivers;

b. PCI (peripheral component interface) bus locking on a memory location of the driver, which may require a PCI bus lock to be implemented in the host driver 14 and device 10; or c. locking a device memory register, such as but not limited to, a "set by read" register as a semaphore or a "set by write" register as a semaphore.

If the driver 14 does not lock access to device 10, then the procedure may go back to step 103. If the driver 14 locks access to device 10, and thereby gains access to the device 10 for download purposes, the driver 14 may again verify that it is the only driver that is accessing the device 10 for download purposes (step 105), and that the firmware of device 10 has not yet been downloaded, so as to avoid race conditions (step 106). If the firmware of device 10 has already been downloaded, then the process may skip to step 109, described hereinbelow. If the firmware of device 10 has not yet been downloaded, then the driver 14 may commence downloading the firmware (step 107). Downloading may comprise without limitation using programmed I/O, memory-to-memory copy, or bus master DMA (direct memory access) transactions, for example.

The method may comprise downloading at least two firmware functions with a single download. Firmware may be downloaded that is common to at least two of the drivers.

At the end of the download, the driver 14 may set a register or flag (e.g., FW_DL_done) informing that the desired firmware has been downloaded (step 108). The driver 14 may set another bit (e.g., per action, in the function's register space) to start the firmware thread implementing the firmware function (step 109). A functionally may be implemented that is common to at least two of the drivers. Alternatively, a functionality for one of the drivers may be implemented that is different than another of the drivers.

If another function's driver sees that the lock is not gained, that driver may spin lock, wait to check for the lock again or wait until the firmware load is done by the function that is currently locking it (step 109A) and then start its own function's firmware execution (step 111). At the end of the download process, the host driver 14 may release the lock (step 110) according to the lock mechanism used, and permit access to the desired firmware by drivers other than the host driver 14.

It will be appreciated by persons skilled in the art that the present invention is not limited by what has been particularly shown and described herein above. Rather the scope of the invention is defined by the claims that follow:

What is claimed is:

1. A method comprising:
   managing downloading of at least two firmware functions, which when downloaded are accessible by more than one driver, at least one driver using the firmware functions to implement functionality for the driver, with one processor; and
   verifying for said at least one of said drivers if said firmware has been downloaded by another driver, wherein verifying comprises checking at least one of a register and a bit accessible by the at least two drivers to check if the firmware has been downloaded by another driver.

2. The method according to claim 1 wherein said managing comprises reducing a risk of at least one of said drivers overwriting firmware that has been downloaded and is being used by another of said drivers.

3. The method according to claim 1 wherein said managing comprises downloading at least two said firmware functions with a single download.

4. The method according to claim 1 wherein said managing comprises managing downloading of firmware common to at least two of said drivers.

5. The method according to claim 1 wherein said managing comprises managing downloading of firmware by more than one access operation of the same driver.

6. The method according to claim 1 and further comprising, for at least one of said drivers, implementing a functionality common to another of said drivers.

7. The method according to claim 1 and further comprising, for at least one of said drivers, implementing a different functionality than another of said drivers.

8. The method according to claim 1 and further comprising initializing at least one of said drivers with information to determine a desired firmware sufficient to implement a desired functionality.

9. The method according to claim 1 wherein if said firmware has not been downloaded by another driver, then downloading said firmware for said at least one of said drivers.

10. The method according to claim 9 and further comprising locking access to said firmware by drivers other than said at least one of said drivers.

11. The method according to claim 10 wherein said locking access comprises memory spin locking.

12. The method according to claim 10 wherein said locking access comprises PCI (peripheral component interface) bus locking on a memory location of said at least one of said drivers.

13. The method according to claim 10 wherein said locking access comprises locking a device memory register.

14. The method according to claim 10 and further comprising permitting access to said firmware by drivers other than said at least one of said drivers.

15. The method according to claim 9 and further comprising setting a register that said downloading said firmware is finished.

16. The method according to claim 15 and further comprising implementing said firmware.

17. Apparatus comprising:
    a multi-function device that comprises at least two firmware functions which when downloaded are accessible by more than one driver, wherein at least one driver uses the firmware functions to implement functionality for the driver; and
    a processor adapted to manage downloading of said at least two firmware functions and to reduce a risk of at least one of said drivers overwriting firmware that has been downloaded and is being used by another of said drivers, wherein the processor is to check at least one of a register and a bit accessible by the at least two drivers to check if the firmware has been downloaded by another driver.

18. Apparatus according to claim 17 wherein said processor is adapted to download at least two said firmware functions with a single download.

19. Apparatus according to claim 17 wherein said processor is adapted to manage downloading of firmware common to at least two of said drivers.

20. Apparatus according to claim 17 wherein at least one of said drivers is adapted to implement a functionality common to another of said drivers.

21. Apparatus according to claim 17 wherein at least one of said drivers is adapted to implement a different functionality than another of said drivers.

22. Apparatus according to claim 17 wherein at least one of said drivers is initialized with information to determine a firmware sufficient to implement a desired functionality.

23. A system comprising:
    a multi-function device that comprises at least two firmware functions, which when downloaded are accessible by more than one driver, wherein at least one driver is to use the firmware functions to implement functionality for the driver;
    a processor adapted to manage downloading of said at least two firmware functions and to verify for said at least one of said drivers if said firmware has been downloaded by another driver, wherein verifying comprises checking at least one of a register and a bit accessible by the at least two drivers to check if the firmware has been downloaded by another driver; and
    a memory in communication with said processor.

24. The system according to claim 23 wherein said processor is adapted to reduce a risk of at least one of said drivers overwriting firmware that has been downloaded and is being used by another of said drivers.

25. The system according to claim 23 wherein said processor is adapted to download at least two said firmware functions with a single download.

26. A method comprising:
    managing downloading of at least two firmware functions, which when downloaded are accessible by more than one driver, at least one driver using the firmware functions to implement functionality for the driver, with one processor;
    and reducing a risk of at least one of said drivers overwriting firmware that has been downloaded and is being used by another of said drivers, wherein reducing a risk comprises checking at least one of a register and a bit accessible by the at least two drivers to check if the firmware has been downloaded by another driver.

27. The method of claim 26, comprising verifying for a driver if said firmware has been downloaded by another driver.

* * * * *